A. J. KING.
DRILL.
APPLICATION FILED OCT. 24, 1910.
1,033,419.
Patented July 23, 1912.
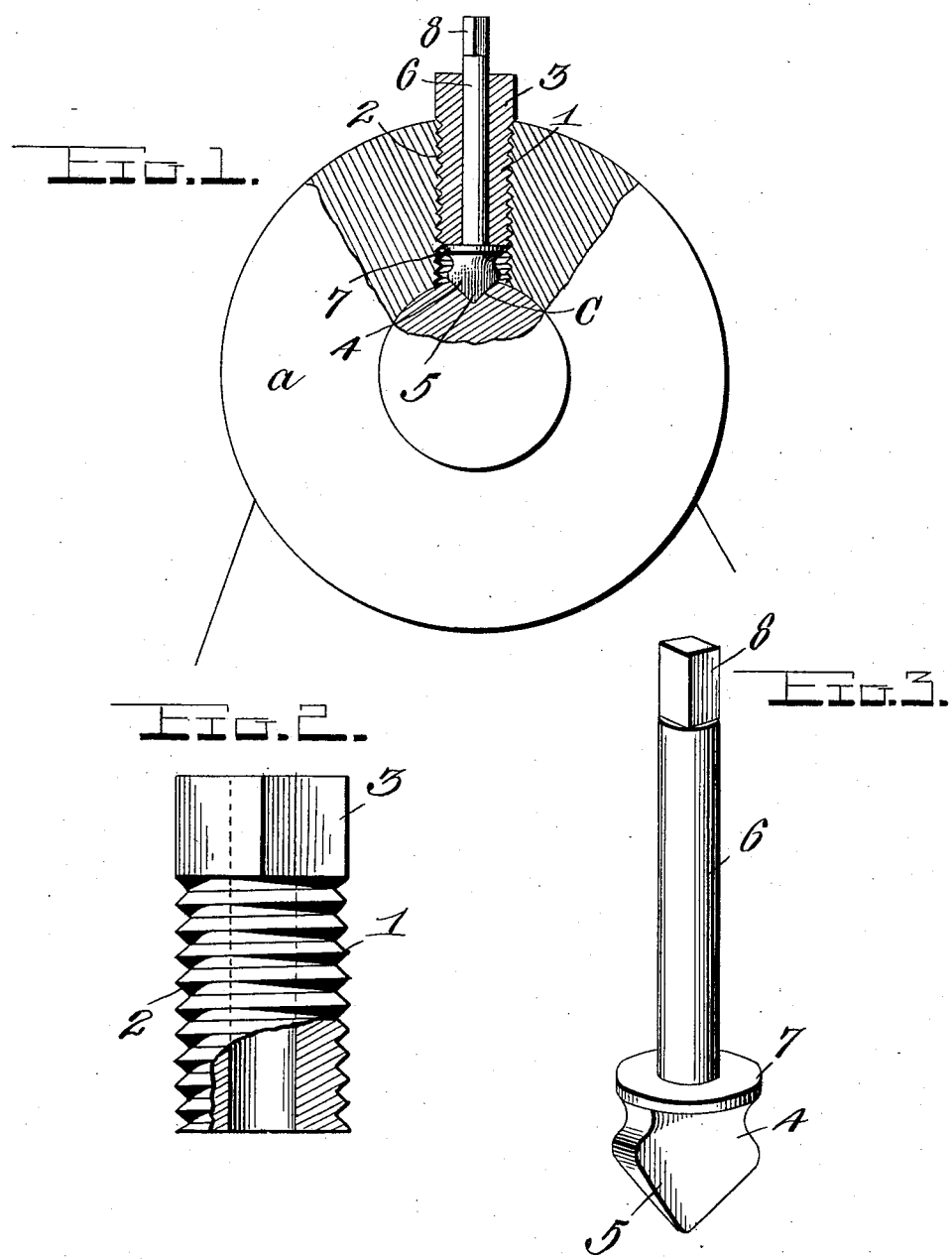

UNITED STATES PATENT OFFICE.

ALLEN J. KING, OF NORTH SCITUATE, RHODE ISLAND.

DRILL.

1,033,419.

Specification of Letters Patent.

Patented July 23, 1912.

Application filed October 24, 1910. Serial No. 588,792.

*To all whom it may concern:*

Be it known that I, ALLEN J. KING, a citizen of the United States, residing at North Scituate, in the county of Providence and State of Rhode Island, have invented certain new and useful Improvements in Drills, of which the following is a specification, reference being had to the accompanying drawings.

This invention is an improved drill adapted for use in drilling a recess in one side of a shaft or arbor, mounted in a bearing or other elements for the reception of the end of a set screw to prevent the shaft or arbor from turning or to secure the same on said element, the object of the invention being to provide an improved drilling device which may be mounted in the threaded opening of the bearing or support while being used, and which enables the shaft or arbor to be provided with the required recess or seat for the set screw without the necessity of first removing the shaft or arbor from the support or element, the invention consisting in the construction, combination and arrangement of devices hereinafter described and claimed.

In the accompanying drawings—Figure 1 is a sectional view of a drilling device constructed in accordance with my invention, showing the same mounted in the threaded opening of a support, and in the act of drilling a recess or seat in one side of a shaft or arbor mounted in the said support. Fig. 2 is a detail elevation partly in section of the drill holder. Fig. 3 is a detail elevation of the drill.

In accordance with my invention, I provide a drill holder 1, which has a screw threaded portion 2 adapted to be screwed in the threaded opening of a bearing or support *a* for a shaft or arbor *b*. The said holder is provided at its outer end with a polygonal head 3 whereby it may be turned with a wrench, and is further provided with a central bore which extends longitudinally therethrough, from end to end.

In connection with the drill holder, I provide a drill bit 4 which comprises a drill head 5 of suitable size and shape to enable the same to drill or ream out a seat or recess *c*, in one side of the shaft or arbor for the reception of the end of a set screw employed to prevent the shaft or arbor from turning. The drill bit is further provided with a cylindrical shank 6 which fits and is revoluble in the bore of the drill holder and is of such length that the outer end of the said shank projects from that of the drill holder, there being a shoulder 7 at the inner end of the shank, to bear against the inner end of the drill holder, and a polygonal head 8 at the outer end of the shank for engagement by a wrench or brace to rotate the drill body so as to cause the same to make the required cut, seat, or recess in the shaft or arbor.

In practice the holder and drill bit will be of any required size according to the nature of the work and in practice, I will manufacture drill bits and holders of various sizes for use in connection with shaft or arbor supports or bearings, the threaded openings for the set screws of which are of various diameters.

It will be understood from the foregoing description and by reference to the drawings that my improved drilling device enables a shaft or arbor to be provided with a seat or recess in one side for the reception of the inner end of a set screw without the necessity of first removing the shaft or arbor from the bearing or support in which the same is mounted, and that my improved drill holder when in use is mounted and secured in the threaded opening in the bearing or support in which the set screw is to be afterward applied.

Furthermore, it will be understood, that by means of my improved drill device, a shaft or arbor may be provided with a seat for the reception of the inner end of a set screw, and in a very short time, and at very slight expense.

I claim:

In combination with a shaft bearing having a radial, threaded opening intersecting the bearing opening, a tubular holder having an angular outer head adapted to be engaged by a wrench and having a threaded portion to enter the radial opening of the bearing and engage the threads thereof, whereby said tubular holder, when rotated, may be moved radially in the bearing, and a drill bit comprising a stem extending through and revoluble in the bore of the holder, provided at its outer end with means for engagement by a wrench or the like and provided at its inner end with a drill head and also with an annular shoulder at the inner side of the drill head, the said annular shoulder being of less diameter than and bearing against the inner end of the tubular holder.

In testimony whereof I hereunto affix my signature in the presence of two witnesses.

ALLEN J. KING.

Witnesses:
WILLIAM E. SPENCER,
ALICE M. FARROW.

Copies of this patent may be obtained for five cents each, by addressing the "Commissioner of Patents, Washington, D. C."